(12) United States Patent
Deng et al.

(10) Patent No.: US 11,205,285 B1
(45) Date of Patent: Dec. 21, 2021

(54) METHOD FOR SPLICING VECTOR POLYGON REGIONS WITH HOLES

(71) Applicants: Sichuan Tianyi Ecological Garden Group Co. LTD, Chengdu (CN); Chengdu University of Technology, Chengdu (CN)

(72) Inventors: Fei Deng, Chengdu (CN); Siling Yu, Chengdu (CN); Yufan Wang, Chengdu (CN); Yuanxiang Huang, Chengdu (CN); Lina Wang, Chengdu (CN)

(73) Assignees: SICHUAN TIANYI ECOLOGICAL GARDEN GROUP CO. LTD, Sichuan (CN); CHENGDU UNIVERSITY OF TECHNOLOGY, Sichuan (CN)

( * ) Notice: Subject to any disclaimer, the term of this patent is extended or adjusted under 35 U.S.C. 154(b) by 0 days.

(21) Appl. No.: 17/144,525

(22) Filed: Jan. 8, 2021

(30) Foreign Application Priority Data

Oct. 27, 2020 (CN) .......................... 202011165576.5

(51) Int. Cl.
G06T 11/20 (2006.01)
G06T 5/50 (2006.01)
G06T 3/40 (2006.01)

(52) U.S. Cl.
CPC ............ G06T 11/20 (2013.01); G06T 3/4038 (2013.01); G06T 5/50 (2013.01); *G06T 2210/12* (2013.01)

(58) Field of Classification Search
None
See application file for complete search history.

(56) References Cited

U.S. PATENT DOCUMENTS

| | | | | |
|---|---|---|---|---|
| 8,872,848 | B1* | 10/2014 | Appleton | G06T 11/206 345/629 |
| 8,983,646 | B1* | 3/2015 | Hanna | G06T 17/20 700/119 |
| 2005/0138549 | A1* | 6/2005 | Kayahara | G06T 11/60 715/243 |
| 2006/0089197 | A1* | 4/2006 | Ajioka | A63F 13/10 463/31 |
| 2008/0158251 | A1* | 7/2008 | Sathe | G06T 19/00 345/620 |
| 2014/0233809 | A1* | 8/2014 | Shu | G06T 3/4038 382/109 |
| 2021/0200218 | A1* | 7/2021 | Albrecht | G05D 1/0088 |

* cited by examiner

*Primary Examiner* — Nurun N Flora
(74) *Attorney, Agent, or Firm* — Chun-Ming Shih; Lanway IPR Services

(57) ABSTRACT

The present invention discloses a method for splicing vector polygon regions with holes, comprising the steps of: acquiring any two vector polygon regions A1 and A2 to be spliced, the outer frame P1 of A1 and the outer frame P2 of A2; judging whether P1 and P2 have overlapping parts; storing the connection relationship of the non-overlapping edges and the non-overlapping edges of P1 and P2 in a data table T; performing intersection on the overlapping edges of P1 and P2 and storing the overlapping edges in the data table T; traversing the data table T, finding the connection relationship of edges, and constructing the splicing of vector polygon regions. According to the scheme, the present invention has the advantages of wide application range, high splicing efficiency and the like, and has high practical value and popularization value in the technical field of vector graphics splicing.

5 Claims, 3 Drawing Sheets

METHOD FOR SPLICING VECTOR POLYGON REGIONS WITH HOLES

TECHNICAL FIELD

The present invention relates to the technical field of vector graphics splicing, in particular to a method for splicing vector polygon regions with hole

BACKGROUND

In deep learning based on neural network, neural network cannot deal with images with large resolution due to hardware constraints. Therefore, it is necessary to divide the large-resolution images to be processed into a large number of low-resolution images, and then carry out deep learning, and then splice the vectorized graphics. However, the splicing between vector graphics will lead to overlapping parts of adjacent vector polygons, which makes it impossible to construct a continuous vector polygon region. At the same time, decorative patterns with complex structures can be seen in some design and manufacturing fields or artworks, and these complex patterns are usually formed by splicing simple graphics.

In recent years, some scholars have studied the splicing of vector graphics. Zhou Shizhe and others put forward the concept of a topology descriptor, which determines the splicing mode of both sides of vector graphics. This method can realize the splicing of polygon regions, and construct the vector polygon regions to be spliced into a single object. However, due to the fact that the topology descriptor only contains the information of the splicing mode on both sides of the object, the method limits the splicing of vector polygons to be only spliced along one direction or the opposite direction, so that only one chain vector polygon can be formed, and vector polygons in any direction cannot be spliced. For example, the Chinese invention patent with the Patent Application NO. 201910655043.6 entitled as "Automatic Image Segmentation Method And Device Based On Deep Learning Edge Detection" is provided.

Therefore, it is urgent to propose a method for splicing vector polygon regions with holes, which can solve the problem that the existing methods do not support splicing vector polygon regions extending in any direction, and meet the requirements of removing the overlapping parts when splicing vector polygons in any direction and dealing with internal holes during splicing.

SUMMARY

In view of the above problem, the purpose of the present invention is to provide a method for splicing vector polygon regions with holes. The technical scheme adopted by the present invention is as follows.

A method for splicing vector polygon regions with holes, comprising the steps of:

acquiring any two vector polygon regions A1 and A2 to be spliced, the outer frame P1 of the vector polygon region A1 and the outer frame P2 of the vector polygon region A2;

judging whether the vector polygon region A1 and the vector polygon region A2 are provided with holes, and if holes exist, performing splicing by using the outer frames of the vector polygon regions;

judging whether there are overlapping parts between the outer frame P1 and the outer frame P2, and storing the connection relationship of the non-overlapping edges and the non-overlapping edges of the outer frame P1 and the outer frame P2 in a data table T;

performing intersection on the overlapping edges of the outer frame P1 and the outer frame P2 and storing the overlapping edges in the data table T;

traversing the data table T, finding the connection relationship of edges, and constructing the splicing of vector polygon regions.

Further, judging whether there are overlapping parts between the outer frame P1 and the outer frame P2 comprises the steps of:

traversing each edge of the outer frame P1 sequentially; if there are overlapping parts between the edge of the outer frame P1 and the edge of the outer frame P2, establishing an index relationship between the edge of the outer frame P1 and the edge of the outer frame P2, and storing the index relationship in the overlapping edge index table A;

traversing any edge of the outer frame 2 sequentially; if there are overlapping parts between the edge of the outer frame P2 and the edge of the outer frame P1, establishing an index relationship between the edge of the outer frame P2 and the edge of the outer frame P1, and storing the index relationship in the overlapping edge index table B.

Still further, performing intersection on the overlapping edges of the outer frame P1 and the outer frame P2 comprises the steps of:

performing intersection on the overlapping edges of the outer frame P1 in the overlapping edge index table A and the overlapping edges corresponding to the index values; removing the overlapping parts of the overlapping edges and storing the overlapping edges in data table T;

performing intersection on the overlapping edges of the outer frame P2 in the overlapping edge index table B and the overlapping edges corresponding to the index values; removing the overlapping parts of the overlapping edges and storing the overlapping edges in the data table T.

Further, traversing the data table T to find the connection relationship of edges comprises the steps of:

getting the distance D between the end points of the edge of the outer frame in the data table T;

if the distance D is less than the preset minimum value, regarding it as an adjacent point, and establishing the connection relationship of the corresponding edges.

Further, constructing the splicing of vector polygon regions comprises the steps of:

traversing any edge in the data table T, and setting the previous edge and the next edge of any edge to traverse and form all vector polygon frames, and if the number of vector polygon frames finally formed is greater than 1, indicating that there are holes in the vector polygon regions;

according to the outer bounding box of the formed vector polygon frame, finding the largest polygon frame of the outer bounding box, finding the inclusion relationship of the polygon frame and constructing the vector polygon region.

Compared with the prior art, the present invention has the following beneficial effects.

(1) The present invention skillfully uses traversing any edge of the outer frame of the vector polygon, so as to remove the overlapping part of the overlapping edge, reduce the calculation workload, and at the same time ensure that the edge stored in the data table is unique, so as to facilitate the later relationship search and establishment.

(2) The present invention skillfully uses the minimum distance value to obtain the end point relationship, so as to establish the sequentially connected relationship, which is not affected by the inclination angle and is suitable for splicing various complex vector polygon regions and vector polygon regions containing internal holes.

(3) The present invention uses the vector collinear theorem to judge the overlapping of edges, which effectively solves the problem that the vector polygon regions cannot be spliced in any direction in the prior art, and is suitable for many scenes and has high splicing efficiency.

To sum up, the present invention has the advantages of wide application range, high splicing efficiency and the like, and has high practical value and popularization value in the technical field of vector graphics splicing.

BRIEF DESCRIPTION OF THE DRAWINGS

In order to explain the technical scheme of the embodiments of the present invention more clearly, the following drawings used in the embodiments will be briefly introduced. It should be understood that the following drawings only show some embodiments of the present invention, so they should not be regarded as limiting the scope of protection. For those skilled in the art, other related drawings can be obtained according to these drawings without paying creative labor.

DESCRIPTION OF THE EMBODIMENTS

In order to make the purpose, technical scheme and advantages of the present invention clearer, the present invention will be further explained with reference to the drawings and examples, and the embodiments of the present invention include but are not limited to the following examples. Based on the embodiments in the present invention, all other embodiments obtained by those skilled in the art without paying creative labor belong to the scope of protection of the present invention.

Embodiment

Figure 1:
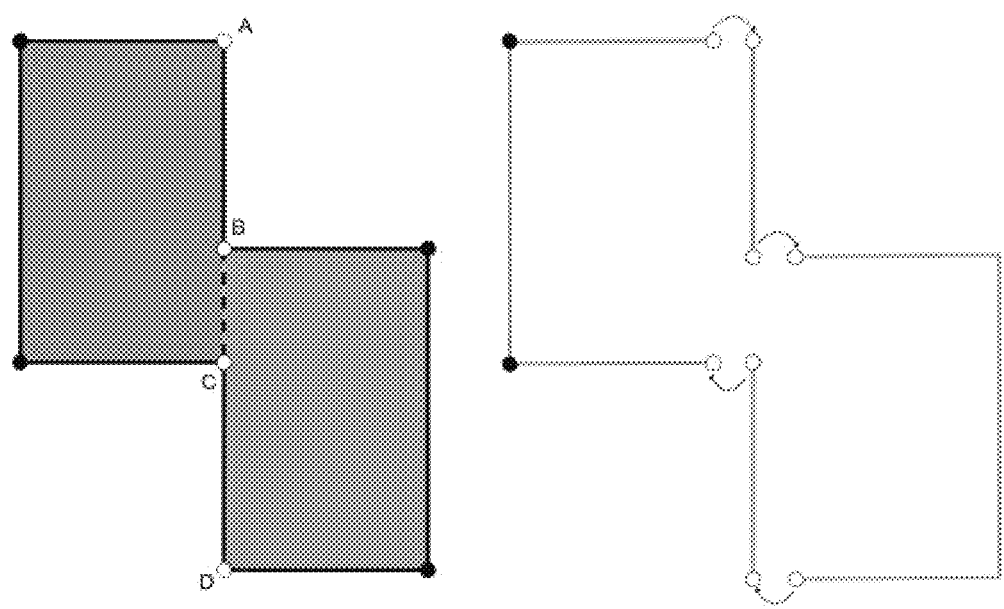
FIG. 1 is a schematic diagram of splicing vector polygon regions without holes.
Figure 2:
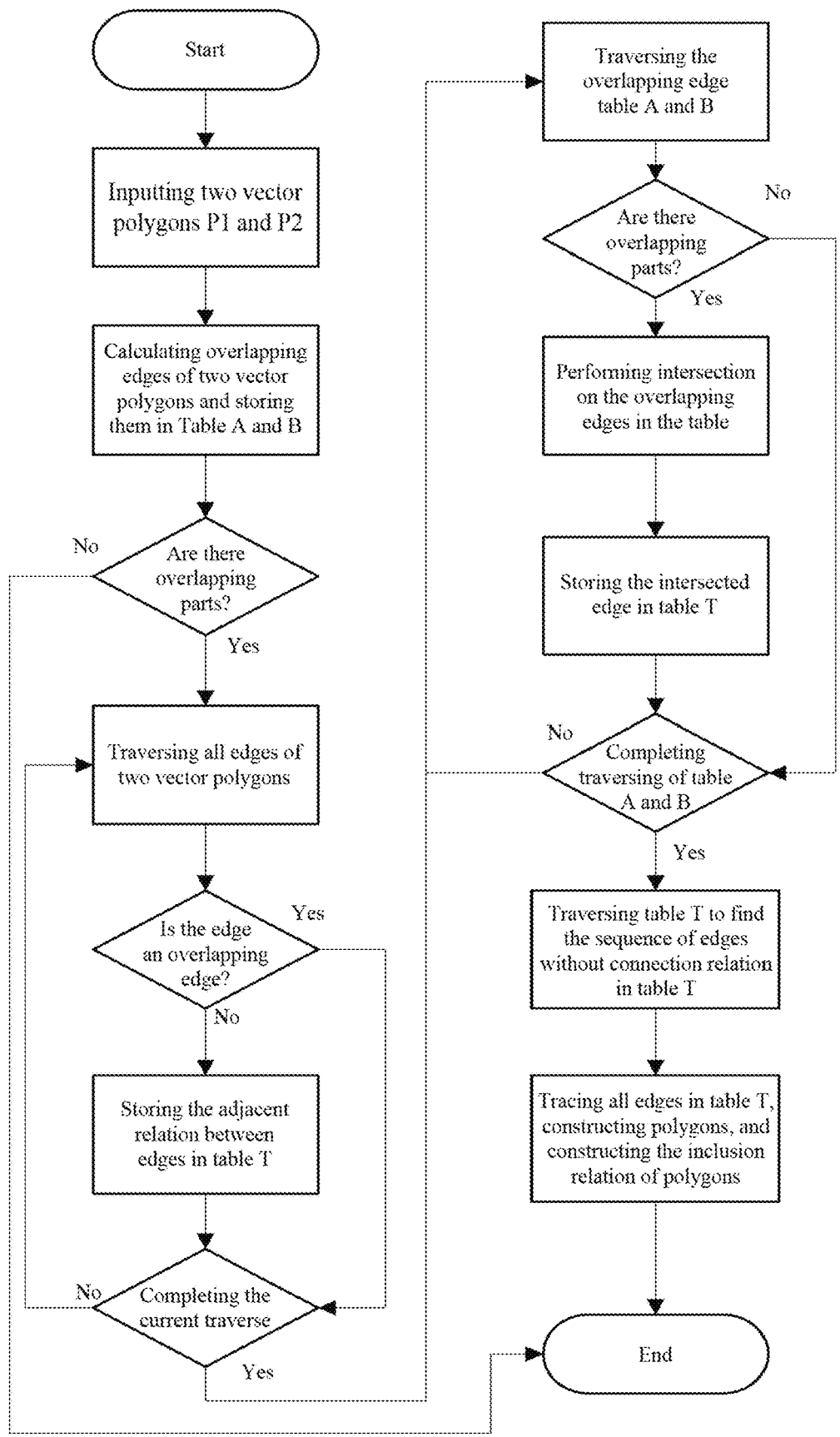
FIG. 2 is a flowchart of splicing according to the present invention.
Figure 3:
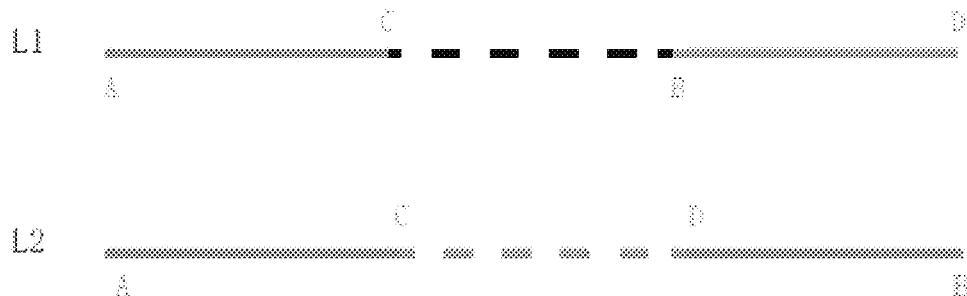
FIG. 3 is a distribution diagram of overlapping edges of the outer frame of the vector polygon regions according to the present invention.
Figure 4:
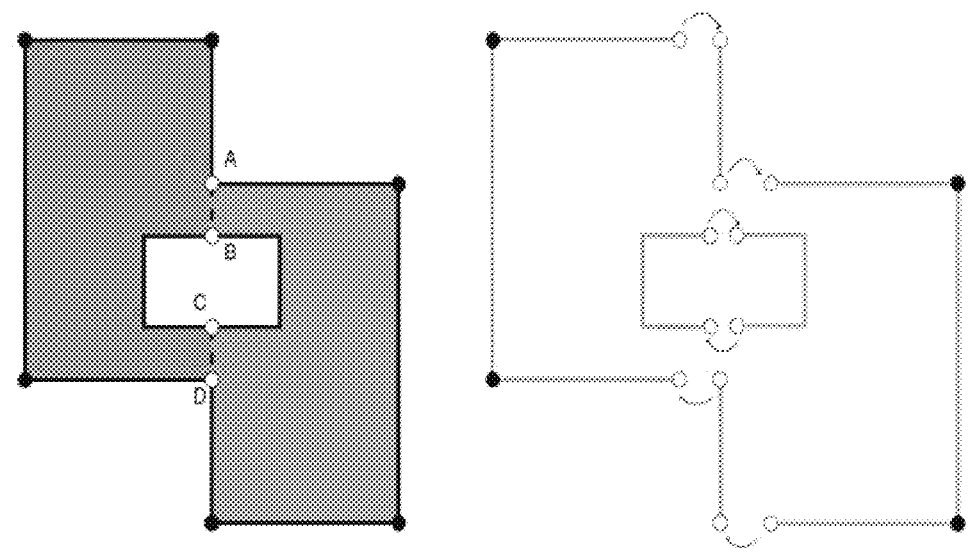
FIG. 4 is a schematic diagram of the internal hole structure of an overlapping edge according to the present invention (AB and CD are overlapping edges).
Figure 5:
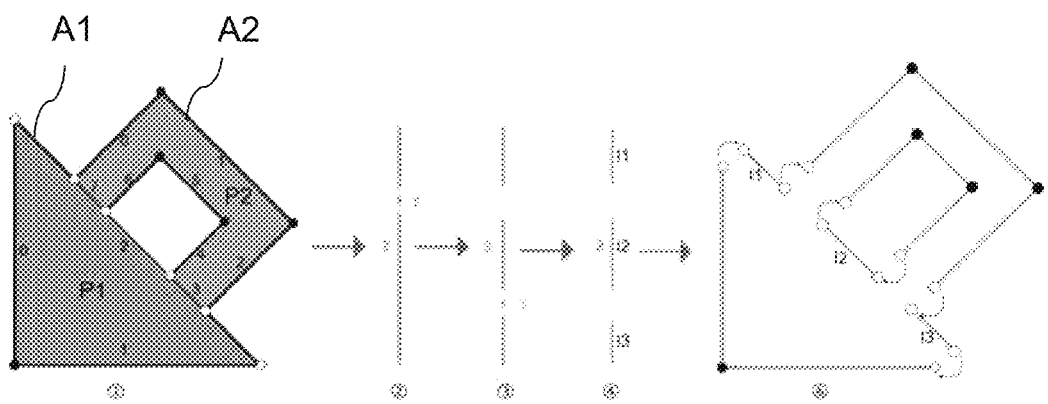
FIG. 5 is a flowchart of an example of splicing vector polygon regions according to the present invention.

As shown in FIG. 1 to FIG. 5, this embodiment provides a method for splicing vector polygon regions with holes, comprising the following steps.

In this embodiment, A1 represents the first vector polygon region, and A2 represents the second vector polygon region. P1 represents the outer frame of A1 and P2 represents the outer frame of A2. Table T is used to store the connection relationship of the edges and the edges of the outer frames of two vector polygons; Table A is used to store the overlapping edge index of P1; Table B is used to store the overlapping edge index of P2.

The structural diagram of a data table T according to the present invention is as follows:

TABLE T

| Index quotation mark | Index quotation mark of a previous edge | Index quotation mark of a next edge | Endpoint subscript of a previous edge | Endpoint subscript of a next edge |
| --- | --- | --- | --- | --- |
| 0 | 1024 | 1 | 1 | 0 |
| 1 | 0 | 2 | 1 | 0 |
| 2 | 1 | 3 | 1 | 0 |
| . | . | . | . | . |
| . | . | . | . | . |
| . | . | . | . | . |

The structural diagram of an overlapping edge index table A and an overlapping edge index table B according to the present invention is as follows:

TABLE A

| Index quotation mark of the overlapping edge of P1 | Index quotation mark of the overlapping edge of P2 and P1 | |
| --- | --- | --- |
| 2 | 3 | 7 |

TABLE B

| Index quotation mark of the overlapping edge of P2 | Index quotation mark of the overlapping edge of P1 and P2 |
| --- | --- |
| 3 | 2 |
| 7 | 2 |

The detailed steps are as follows.

In the first step, it is judged whether the vector polygon regions A1 and A2 are provided with holes. If holes exist, only the outer frames of the vector polygon are used for splicing. Each edge of the outer frame P1 is traversed, and overlapping judgment is made between the currently traversed edge S of the outer frame P1 and every edge in the outer frame P2. If there is an overlapping part between the edge and S in the outer frame P2, the index relationship between the edge S and the overlapping edge of the outer frame P2 is established and stored in Table A. The above step is repeated to traverse every edge of the outer frame P2. The index relationship between the overlapping edge of the outer frame P2 and the overlapping edge of the outer frame P1 is established and stored in table B.

According to the vector collinear theorem and the inclusion relationship of components of each vector in x direction or y direction, overlapping judgment of edges can be made. Assuming that one edge of outer frame P1 is p0p1 and one edge of outer frame P2 is p2p3, the unit direction vector of edge p0p1 can be calculated as:

$$\vec{d}_1 = \frac{p_1 - p_0}{t_1},$$

and the unit direction vector of p2p3 is:

$$\vec{d}_2 = \frac{p_3 - p_2}{t_2},$$

where t1 is the modulus length of vector p0p1 and t2 is the modulus length of vector p2p3. If $\vec{d}_1 \times \vec{d}_2 = 0$, according to the vector collinear theorem, it can be known that vectors p0p1 and p2p3 are parallel or collinear. The unit direction vector of vector p2p0 is calculated:

$$d_3 = \frac{p_2 - p_0}{t_3},$$

where t3 is the module length of vector p2p0. If $\vec{d}_3 \times \vec{d}_1 = 0$ or $\vec{d}_3 \times \vec{d}_2 = 0$, it can be judged that vectors p0p1 and p2p3 are collinear according to the properties of the vectors. When the two line segments are not perpendicular to the x direction, it is only necessary to calculate the components of each vector in the x direction. If there is an inclusion relationship between the components, it can be judged that there are overlapping parts between the two line segments; when two line segments are perpendicular to the x direction, it is only necessary to judge whether the components of each vector in the Y direction have an inclusion relationship.

In the second step, the outer frame P1 and the outer frame P2 are traversed, and the connection relationship of the non-overlapping edges and the edges is stored in table T.

In the third step, the overlapping edge index table A is traversed, and intersection is performed on the overlapping edges of the outer frame P1 in table A and the overlapping edges corresponding to the index values. The intersection processing is to remove the overlapping parts of the edges and store the intersected connection relationship between the edges in table T. In the same way, the same operation is used to traverse index table B, and the result is stored in table T.

In the fourth step, table T is traversed to find the connection relationship for the edge without connection relationship in table T. Finding the connection relationship of edges means finding the adjacent points of edges, which should be searched from back to front in table T. Whether it is an adjacent point can be judged by calculating the distance between the point and the endpoints of all edges in table T (excluding the edge where the point itself is located). If the distance is a minimum value (such as 10^−8), it can be regarded as an adjacent point. Finding the adjacent point means finding the NearEdge where the adjacent point is located, and the connection relationship between edge and NearEdge is finally established according to the subscript of the adjacent point.

In the fifth step, according to the connection relationship of edges in table T, all edges are traced and connected to construct polygon frames, and the inclusion relationship between polygon frames is calculated to construct vector polygon regions. First, all edges in table T are traversed, the previous edge and the next edge of each edge are set, and all vector polygon frames are constructed after finishing traversing. If the number of the finally formed vector polygon frames is greater than 1, it indicates that there are holes in the vector polygon region. All vector polygon frames are traversed, the largest polygon frame of the outer bounding box is found according to the polygon outer bounding box, the small polygon frame is included in the large polygon frame, the polygon frame inclusion relationship is found, and the vector polygon region is constructed.

A case is listed for illustration.

(1) The overlapping edges of the outer frame P1 and the outer frame P2 are calculated, and the overlapping edge index relationship tables A and B are established. The overlapping edges of P2 corresponding to edge 2 of P1 in table A are 3 and 7, and the overlapping edges of P1 corresponding to edge 7 and edge 3 in table B are both 2.

(2) According to tables A and B obtained in S1, the edge 2 of the outer frame P1 and the edges 3 and 7 of the outer frame P2 are removed, and the connection relationship between the remaining edges is stored in table T.

(3) Tables A and B are traversed, and the overlapping parts of overlapping edges are removed to obtain edges 11, 12 and 13. The edges 11, 12, 13 and their connection relation are stored in table T.

(4) Table T is traversed to find the adjacent points and the edges where the adjacent points are located for the edges without connection relations in table T, and the connection relation between edges and adjacent edges is constructed.

(5) All edges of table T are tracked and all edges are connected to form a vector polygon frame. The inclusion relationship between polygon frames is found and the vector polygon region is constructed.

The above embodiments are only preferred embodiments of the present invention, rather than limit the scope of protection of the present invention. All changes made by adopting the design principle of the present invention and carrying out non-creative labor on this basis should belong to the scope of protection of the present invention.

What is claimed is:

1. A method for splicing vector polygon regions with holes, comprising the steps of:
    acquiring any two vector polygon regions A1 and A2 to be spliced, the outer frame P1 of the vector polygon region A1 and the outer frame P2 of the vector polygon region A2;
    judging whether the vector polygon region A1 and the vector polygon region A2 are provided with holes, and if holes exist, performing splicing by using the outer frames of the vector polygon regions;
    judging whether there are overlapping parts between the outer frame P1 and the outer frame P2, and storing the connection relationship of the non-overlapping edges and the non-overlapping edges of the outer frame P1 and the outer frame P2 in a data table T;
    performing intersection on the overlapping edges of the outer frame P1 and the outer frame P2 and storing the overlapping edges in the data table T;
    traversing the data table T, finding the connection relationship of edges, and constructing the splicing of vector polygon regions.

2. The method for splicing vector polygon regions with holes according to claim 1, wherein judging whether there are overlapping parts between the outer frame P1 and the outer frame P2 comprises the steps of:
    traversing each edge of the outer frame P1 sequentially; if there are overlapping parts between the edge of the outer frame P1 and the edge of the outer frame P2, establishing an index relationship between the edge of the outer frame P1 and the edge of the outer frame P2, and storing the index relationship in the overlapping edge index table A;
    traversing any edge of the outer frame 2 sequentially; if there are overlapping parts between the edge of the outer frame P2 and the edge of the outer frame P1, establishing an index relationship between the edge of the outer frame P2 and the edge of the outer frame P1, and storing the index relationship in the overlapping edge index table B.

3. The method for splicing vector polygon regions with holes according to claim 2, wherein performing intersection on the overlapping edges of the outer frame P1 and the outer frame P2 comprises the steps of:

performing intersection on the overlapping edges of the outer frame P1 in the overlapping edge index table A and the overlapping edges corresponding to the index values of the overlapping edge index table A; removing the overlapping parts of the overlapping edges and storing the overlapping edges in data table T;

performing intersection on the overlapping edges of the outer frame P2 in the overlapping edge index table B and the overlapping edges corresponding to the index values of the overlapping edge index table B; removing the overlapping parts of the overlapping edges and storing the overlapping edges in the data table T.

4. The method for splicing vector polygon regions with holes according to claim 1, wherein traversing the data table T to find the connection relationship of edges comprises the steps of:

getting the distance D between the end points of the edge of the outer frame in the data table T;

if the distance D is less than a preset minimum value, regarding it as an adjacent point, and establishing the connection relationship of the corresponding edges.

5. The method for splicing vector polygon regions with holes according to claim 1, wherein constructing the splicing of vector polygon regions comprises the steps of:

traversing any edge in the data table T, and setting the previous edge and the next edge of any edge to traverse and form all vector polygon frames, and if the number of vector polygon frames finally formed is greater than 1, indicating that there are holes in the vector polygon regions;

according to the outer bounding box of the formed vector polygon frame, finding the largest polygon frame of the outer bounding box, finding the inclusion relationship of the polygon frame and constructing the vector polygon region.

* * * * *